3,257,404
PIPERAZINE DERIVATIVES OF DIBENZO[a,d]
CYCLOHEPTADIENE
Jean Clement Louis Fouche, Sceaux, Seine, France, assignor to Rhone-Poulenc S.A., Paris, France, a French body corporate
No Drawing. Filed June 6, 1963, Ser. No. 285,859
Claims priority, application France, June 15, 1962, 900,885; Mar. 4, 1963, 926,742
11 Claims. (Cl. 260—268)

This invention relates to quaternary ammonium derivatives.

The invention provides quaternary ammonium derivatives of the formula:

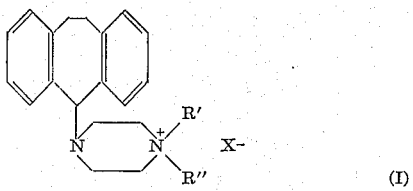

wherein R' and R", which may be the same or different, represent alkyl, alkenyl, hydroxyalkyl, hydroxyalkoxyalkyl, aralkyl or aralkenyl groups and X represents an anion, e.g. a halogen, preferably chlorine or bromine, ion, or an ion of formula A—SO$_2$O— wherein A represents an alkoxy, alkyl, hydroxyalkyl, or mononuclear aryl group, and especially a methosulphate ion. The following groups may be mentioned as examples of R' and R": methyl, ethyl, propyl, butyl, allyl, β-hydroxyethyl, 2-(β-hydroxyethoxy)ethyl, benzyl, phenylethyl, and cinnamyl. The following groups may be mentioned as examples of the ion A—SO$_2$O—; methoxysulphonyloxy (i.e. methosulphate), methanesulphonyloxy, ethoxysulphonyloxy, ethanesulphonyloxy, β-hydroxyethanesulphonyloxy, benzesulphonyloxy and toluene-p-sulphonyloxy.

In this specification it is to be understood that the alkyl and alkenyl groups as well as the alkyl and alkenyl portions of other groups contain 1 to 5 carbon atoms, that the aryl groups are mononuclear aryl groups, and that the carbon atoms of the piperazine nucleus may carry one to four alkyl, especially methyl, groups.

The compounds of the invention may be prepared by the quaternisation of a compound of general formula:

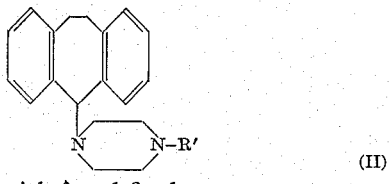

wherein R' is as hereinbefore defined.

This quaternisation may be effected by reaction with a compound of general formula R"Y, wherein R" is as hereinbefore defined and Y represents a reactive ester residue. This reaction is advantageously effected in a polar solvent medium, preferably in acetone or a lower aliphatic alcohol, at ambient temperature or with gentle heating. Examples of compounds of formula R"Y which may be used are, more particularly, methyl, ethyl, propyl, allyl, butyl, benzyl, β-phenylethyl or cinnamyl chlorides and bromides, chlorohydrins or bromohydrins of ethylene glycol and trimethylene glycol, dimethyl and diethyl sulphates, and methyl, ethyl, propyl, butyl, benzyl, β-phenylethyl and cinnamyl methanesulphonates, ethanesulphonates, isethionates, benzenesulphonates, and toluene-p-sulphonates.

The compounds of general Formula II may themselves be prepared by the reaction of a reactive ester of general formula:

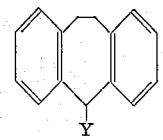

wherein Y, which is as hereinbefore defined, is more especially a halogen atom or a methanesulphonyloxy or toluene-p-sulphonyloxy group, with a piperazine derivative of general formula:

wherein R' is as hereinbefore defined. This reaction is advantageously carried out in an inert organic solvent, such as an aromatic hydrocarbon, preferably at the boiling temperature of the solvent, and utilizing an excess of the piperazine derivative of Formula IV as condensing agent.

The compound of general Formula I may also be prepared by reaction of an amine of general forumla:

wherein R' and R" are as hereinbefore defined, with a dibenzocycloheptadiene derivative of general formula:

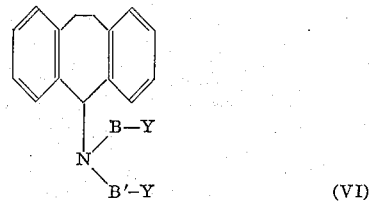

wherein B and B', which may be the same or different, represent ethylene groups or ethylene groups substituted by one or more alkyl groups and Y is as hereinbefore defined. This reaction is preferably carried out in a polar solvent medium, such as an alcohol, acetone or nitrobenzene, by heating the reactants to between 50° and 150° C. It is particularly advantageous to carry out the reaction in a lower aliphatic alcohol at reflux temperature, utilizing the amine of general Formula V in excess of the theoretical quantity required, e.g. at least two molecules per molecule of the compound of general Formula VI.

It is also possible, by the application of known methods, to convert a compound of general Formula I to another compound of general Formula I by modification of the anion X. It is particularly advantageous to use as starting material a compound of general Formula I wherein X represents a chlorine ion.

When it is wished to prepare compounds of general Formula I by a process which simultaneously leads to the synthesis of the piperazine nucleus, it is generally preferable to start with a compound of general Formula VI wherein Y represents a halogen atom and then, if necessary, to apply the above process to give a compound of Formula I wherein X is as desired.

The quaternary ammonium salts of the invention are products having spasmolytic activity and are, in addition, very active as parasympathetic ganglioplegics and as compounds having atropine-like activity.

From the pharmacological viewpoint, the quaternary ammonium derivatives of the invention are distinguished from the corresponding tertiary bases by a 10- to 20-fold greater activity against acetylcholine-induced spasm in isolated rabbit intestine, by an activity at least 15 times weaker against barium chloride-induced spasm in isolated rabbit intestine, by a parasympathetic ganglioplegic activity (demonstrated by inhibition of hypotension induced by peripheral excitation of the vagus in the chloralosed cat) several tenfold greater, and by a more pronounced atropine-like activity (demonstrated by the inhibition of hypotension induced by the intravenous injection of acetylchloline).

From the clinical viewpoint, the quaternary ammonium derivatives of the invention exert their spasmolytic effect by selectively blocking the conduction of parasympathetic nervous excitation at the ganglionic synapses; they therefore combine the advantages of atropine and the ganglioplegics without their inconveniences. These properties are greater and more sharply defined than in the corresponding tertiary bases and acid addition salts which, in contrast, have a more marked direct spasmolytic activity on smooth muscle fibre.

The following non-limitative examples illustrate the invention.

*Example 1*

A solution of dimethylsulphate (4.3 g.) in anhydrous acetone (10 cc.) is added dropwise over ten minutes to a solution of 5-(4-methyl-1-piperazinyl)-dibenzo[a,d]cycloheptadiene (9.9 g.) in anhydrous acetone (200 cc.). The temperature rises from 22° to 27° C. and the reaction mixture is allowed to return to ambient temperature in three hours. A white product crystallises. The crystals are collected, washed twice with anhydrous acetone (70 cc. total) and dried in vacuo, giving 4-(5-dibenzo[a,d]cycloheptadienyl) - 1,1-dimethylpiperazinium methosulphate (11.9 g.), M.P. about 190°–193° C.

The 5 - (4 - methyl - 1-piperazinyl)-dibenzo [a,d]cycloheptadiene starting material is prepared by reacting 1-methylpiperazine with 5 - chloro - dibenzo[a,d]cycloheptadiene as follows. 1-methylpiperazine (8.00 g.) dissolved in anhydrous toluene (30 cc.) is added to a solution of 5-chloro-dibenzo[a,d]cycloheptadiene (9.14 g.) in anhydrous toluene (150 cc.). The reaction mixture is heated under reflux for 4 hours and then, after cooling, treated with distilled water (120 cc.), anaesthetic-grade diethyl ether (80 cc.) and sodium hydroxide solution (d.=1.33; 5 cc.). The aqueous layer is separated and washed with anaesthetic-grade diethyl ether (100 cc.). The combined organic phases are extracted three times with 2 N aqueous acetic acid solution (440 cc. total). The acetic solutions are combined, washed with anaesthetic-grade diethyl ether (150 cc.) and made alkaline with sodium hydroxide solution (d.=1.33; 50 cc.) diluted with distilled water (50 cc.). The oil which forms is extracted three times with anaesthetic-grade diethyl ether (400 cc. total). The combined ethereal solutions are dried over anhydrous potassium carbonate and evaporated. The crystalline residue obtained is dissolved in boiling isopropanol (12 cc.) and, after cooling, the crystals which form are collected, washed with isopropanol (2 x 5 cc.) and dried in vacuo to give 5-(4-methyl-1-piperazinyl)-dibenzo [a,d]cycloheptadiene (6.45 g.), M.P. 111° C.

5-chloro-dibenzo [a,d]cycloheptadiene is itself obtained by the method of Mychajlyszyn and Protiva, Coll. Czechoslov. Chem. Communs 24, 3955–65 (1959); Chem. Abs. 54, 8766 (1960).

*Example 2*

A solution of dimethyl sulphate (3.3 g.) in anhydrous acetone (10 cc.) is added, dropwise, over three minutes to a solution of 5-(4-ethyl-1-piperazinyl)-dibenzo[a,d]cycloheptadiene (8.0 g.) in anhydrous acetone (60 cc.). The temperature rises from 24° to 32° C. and is allowed to return to ambient temperature over three hours. A white product crystallises. The crystals are collected, washed twice with anhydrous acetone (20 cc. total) and dried in vacuo to give 4-(5-dibenzo[a,d]cycloheptadienyl) - 1 - methyl - 1 - ethylpiperazinium methosulphate (10.3 g.), M.P. about 168°–170° C.

The 5 - (4-propyl-1-piperazinyl)-dibenzo[a,d]cycloheptadiene starting material, M.P. about 90° C., is prepared by reacting 1-ethyl-piperazine with 5-chloro-dibenzo[a,d]cycloheptadiene in toluene under reflux, as described in Example 1 for the corresponding methyl derivative.

*Example 3*

A solution of dimethyl sulphate (3.5 g.) in anhydrous acetone (10 cc.) is added, dropwise, over two minutes to a solution of 5-(4-propyl-1-piperazinyl)-dibenzo[a,d]cycloheptadiene (9.0 g.) in anhydrous acetone (100 cc.). The temperature rises from 25° to 29° C. and is allowed to return to ambient temperature over three hours. A white product crystallises. The crystals are collected, washed twice with anhydrous acetone (40 cc. total), and dried in vacuo to give 4-(5-dibenzo[a,d]cycloheptadienyl) - 1 - methyl-1-propyl-piperazinium methosulphate (11.1 g.), M.P. about 201°–203° C.

The 5 - (4-propyl-1-piperazinyl)-dibenzo[a,d]cycloheptadiene starting material, M.P. about 84° C., is prepared by reacting 1-propylpiperazine with 5-chloro-dibenzo [a,d]cycloheptadiene in toluene under reflux, as described in Example 1 for the corresponding methyl derivative.

*Example 4*

A solution of dimethyl sulphate (3.0 g.) in anhydrous acetone (10 cc.) is added, dropwise, over two minutes to a solution of 5-(4-butyl-1-piperazinyl)-dibenzo[a,d]cycloheptadiene (8.0 g.) in anhydrous acetone (75 cc.). The temperature rises from 25° to 30° C. and is allowed to return to ambient temperature over three hours. A white product crystallises. The crystals are separated, washed twice with anhydrous acetone (30 cc. total), and dried in vacuo to give 4-(5-dibenzo[a,d]cycloheptadienyl)-1-methyl-1-butylpiperazinium methosulphate (9.6 g.), M.P. about 207°–209° C.

The 5-(4-butyl-1-piperazinyl)-dibenzo[a,d]cycloheptadiene starting material, M.P. about 78° C., is prepared by reacting 1-butylpiperazine with 5-chloro-dibenzo[a,d]cycloheptadiene in toluene under reflux, as described in Example 1 for the corresponding methyl derivative.

*Example 5*

A solution of dimethyl sulphate (2.35 g.) in anhydrous acetone (10 cc.) is added, dropwise, over five minutes to a solution of 5-(4-β-hydroxyethyl-1-piperazinyl)-dibenzo[a,d]cycloheptadiene (6.0 g.) in anhydrous acetone (30 cc.). The temperature rises from 24° to 27° C. and is allowed to return to ambient temperature over three hours. A white product crystallises. The crystals are collected, washed twice with anhydrous acetone (20 cc. total), and dried in vacuo to give 4-(5-dibenzo[a,d]cycloheptadienyl) - 1 - methyl - 1-β-hydroxyethylpiperazinium methosulphate (6.8 g.), M.P. about 144°–146° C.

The 5-(4-β-hydroxyethyl-1-piperazinyl) - dibenzo[a,d]cycloheptadiene starting material, M.P. about 129° C., is prepared by reacting 1-β-hydroxyethylpiperazine with 5-chloro-dibenzo[a,d]cycloheptadiene in toluene under reflux, as described in Example 1 for the corresponding methyl derivative.

*Example 6*

A solution of dimethyl sulphate (3.4 g.) in anhydrous acetone (10 cc.) is added, dropwise, over two minutes to a solution of 5-(4-benzyl-1-piperazinyl)-dibenzo[a,d]cycloheptadiene (10.0 g.) in anhydrous acetone (250 cc.).

The temperature remains at 25° C. and a product slowly crystallises. After standing for 18 hours at ambient temperature, the crystals are collected, washed twice with anhydrous acetone (40 cc. total), and dried in vacuo to give 4-(5-dibenzo[a,d]cycloheptadienyl)-1-methyl-1-benzylpiperazinium methosulphate (10.5 g.), M.P. about 218°–222° C.

The 5-(4-benzyl-1-piperazinyl)-dibenzo[a,d]cycloheptadiene starting material, M.P. about 120°–121° C., is prepared by reacting 1-benzylpiperazine with 5-chloro-dibenzo[a,d]cycloheptadiene in toluene under reflux.

*Example 7*

A solution of dimethyl sulphate (3.5 g.) in anhydrous acetone (10 cc.) is added, dropwise, over two minutes to a solution of 5-(4-isopropyl-1-piperazinyl)-dibenzo[a,d]cycloheptadiene (9.0 g.) in anhydrous acetone (50 cc.). The temperature rises from 25° to 30° C. and is allowed to fall to ambient temperature over three hours. A white product crystallises. The crystals are collected, washed twice with anhydrous acetone (30 cc. total), and dried in vacuo to give 4-(5-dibenzo[a,d]cycloheptadienyl)-1-methyl-1-isopropylpiperazinium methosulphate (10.0 g.), M.P. about 201°–203° C.

The 5-(4-isopropyl-1-piperazinyl)-dibenzo[a,d]cycloheptadiene starting material, M.P. about 87° C., is prepared by reacting 1-isopropylpiperazine with 5-chloro-dibenzo[a,d]cycloheptadiene in toluene under reflux.

*Example 8*

A solution of dimethyl sulphate (2.6 g.) in anhydrous acetone (10 cc.) is added, dropwise, over two minutes to a solution of 5-(4-cinnamyl-1-piperazinyl)-dibenzo[a,d]cycloheptadiene (8.0 g.) in anhydrous toluene (150 cc.). The temperature rises from 25° to 28° C. and is allowed to fall to ambient temperature over five hours. A product slowly crystallises. The crystals are then collected, washed twice with anhydrous acetone (30 cc. total), and dried in vacuo to give 4-(5-dibenzo[a,d]cycloheptadienyl)-1-methyl-1-cinnamylpiperazinium methosulphate (9.8 g.), M.P. about 214°–216° C.

The 5-(4-cinnamyl-1-piperazinyl)-dibenzo[a,d]cycloheptadiene starting material, M.P. about 142° C., is prepared by reacting 1-cinnamylpiperazine with 5-chloro-dibenzo[a,d]cycloheptadiene in toluene under reflux.

*Example 9*

A solution of dimethyl sulphate (1.8 g.) in anhydrous acetone (10 cc.) is added, dropwise, over two minutes to a solution of 5-(4-β-phenylethyl-1-piperazinyl)-dibenzo[a,d]cycloheptadiene (5.5 g.) in anhydrous acetone (50 cc.). The temperature rises from 25° to 30° C. and is allowed to return to ambient temperature over three hours. A white product crystallises. The crystals are collected, washed twice with anhydrous acetone (20 cc. total), and dried in vacuo to give 4-(5-dibenzo[a,d]cycloheptadienyl)-1-methyl-1-β-phenylethylpiperazinium methosulphate (6.4 g.), M.P. about 160°–170° C.

The 5-(4-β-phenylethyl-1-piperazinyl)-dibenzo[a,d]cycloheptadiene starting material, M.P. about 99°–100° C., is prepared by reacting 1-β-phenylethylpiperazine with 5-chloro-dibenzo[a,d]cycloheptadiene in toluene under reflux.

*Example 10*

A solution of methyl bromide in anhydrous acetone (containing 3.8 moles of methyl bromide per litre of solution; 4.6 cc.) is added to a solution of 5-[4-2′-(β-hydroxyethoxy)ethyl-1-piperazinyl]-dibenzo[a,d]cycloheptadiene (5.8 g.) in anhydrous acetone (25 cc.). The reaction mixture is allowed to stand for 24 hours at ambient temperature in a stoppered flask. A product crystallises. The crystals are collected, washed twice with anhydrous acetone (30 cc. total), and dried in vacuo to give 4-(5-dibenzo[a,d]cycloheptadienyl)-1-methyl-1-2′-(β-hydroxyethoxy)ethylpiperazinium bromide (7.0 g.), M.P. about 150° C.

The 5-[4-2′-(β-hydroxyethoxy)ethyl-1-piperazinyl]-dibenzo[a,d]cycloheptadiene starting material, the dihydrochloride of which melts at about 170° C., is prepared by reacting 1-[2-(β-hydroxyethoxy)ethyl]piperazine with 5-chloro-dibenzo[a,d]cycloheptadiene in toluene under reflux.

The present invention further includes within its scope pharmaceutical compositons which comprise, in association with a compatible, pharmaceutically acceptable carrier, one or more dibenzo[a,d]cycloheptadiene derivatives of general Formula I. The invention includes especially such compositions made up for oral, rectal, or parenteral administration.

Solid compositions for oral administration include compressed tablets, pills, dispersible powders, and granules. In such solid compositions one or more of the active compounds is or are admixed with at least one inert diluent such as calcium carbonate, potato starch, alginic acid, sucrose or lactose. The compositions may also comprise, as is normal practice, additional substances other than inert diluents, e.g. lubricating agents, such as magnesium stearate.

Liquid compositions for oral administration include pharmaceutically acceptable emulsions, solutions, suspensions, syrups and elixirs containing inert diluents commonly used in the art, such as water and liquid paraffin. Besides inert diluents, such compositions may also comprise adjuvants, such as wetting and suspending agents, and preserving, perfuming, sweetening and flavouring agents.

The compositions according to the invention for oral administration also include capsules of absorbable material such as gelatin containing one or more of the active substances with or without the addition of diluents or excipients.

Preparations according to the invention for parenteral administration include sterile aqueous or non-aqueous solutions, suspensions, or emulsions. Examples of non-aqueous solvents or suspending media are propylene glycol, polyethylene glycol, vegetable oils such as olive oil, and injectable organic esters such as ethyl oleate. These compositions may also contain adjuvants such as preserving, wetting, emulsifying and dispersing agents. They may be sterilized by, for example, filtration through a bacteria-retaining filter, by incorporation in the compositions of sterilising agents, by irradiation, or by heating. They may also be manufactured in the form of sterile solid compositions, which can be dissolved in sterile water or some other sterile injectable medium immediately before use.

Compositions for rectal administration are suppositories which may contain, in addition to the active substance, excipients such as cocoa butter or a suitable wax base.

The percentage of active ingredient in the compositions of the invention may be varied, it being necessary that it should constitute a proportion such that a suitable dosage for the therapeutic effect desired in the species of animal shall be obtained. Ordinarily, the compositions will contain 0.5 to 95% by weight of active ingredient. Generally, the dosages, when given orally, should be between 2 and 50 mg. per day.

The following example illustrates a pharmaceutical composition according to the invention.

*Example 11*

Tablets are prepared having the following composition:

| | Mg. |
|---|---|
| 4-(5-dibenzo[a,d]cycloheptadienyl)-1,1-dimethyl-piperazinium methosulphate | 5 |
| Starch | 110 |
| Silica gel | 32 |
| Magnesium stearate | 3 |

I claim:
1. A quaternary ammonium compound selected from the group consisting of the compounds of the formula:

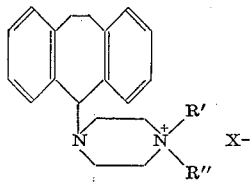

where R' and R" are each selected from the group consisting of alkyl of 1–5 carbon atoms, alkenyl of 2–5 carbon atoms, hydroxyalkyl of 1–5 carbon atoms, hydroxyalkoxyalkyl having 1–5 carbon atoms in both the alkoxy and alkyl residue, (mononuclear aryl)alkyl having 1–5 carbon atoms in the alkyl residue, and (mononuclear aryl)alkenyl having 2–5 carbon atoms in the alkenyl residue, the piperazine nucleus optionally carrying on the carbon atoms up to four alkyl substituents of 1–5 carbon atoms, and X— represents a non-toxic anion.

2. 4 - (5 - dibenzo[a,d]cycloheptadienyl)-1,1-dimethylpiperazinium methosulphate.

3. 4 - (5 - dibenzo[a,d]cycloheptadienyl)-1-methyl-1-ethylpiperazinium methosulphate.

4. 4 - (5 - dibenzo[a,d]cycloheptadienyl)-1-methyl-1-propylpiperazinium methosulphate.

5. 4 - (5 - dibenzo[a,d]cycloheptadienyl)-1-methyl-1-butylpiperazinium methosulphate.

6. 4 - (5 - dibenzo[a,d]cycloheptadienyl)-1-methyl-1-β-hydroxyethylpiperazinium methosulphate.

7. 4 - (5 - dibenzo[a,d]cycloheptadienyl)-1-methyl-1-benzylpiperazinium methosulphate.

8. 4 - (5 - dibenzo[a,d]cycloheptadienyl)-1-methyl-1-isopropylpiperazinium methosulphate.

9. 4 - (5 - dibenzo[a,d]cycloheptadienyl)-1-methyl-1-cinnamylpiperazinium methosulphate.

10. 4 - (5 - dibenzo[a,d]cycloheptadienyl)-1-methyl-1-β-phenylethylpiperazinium methosulphate.

11. 4 - (5 - dibenzo[a,d]cycloheptadienyl)-1-methyl-1-2'-(β-hydroxyethoxy)ethylpiperazinium bromide.

References Cited by the Examiner

UNITED STATES PATENTS

| | | | |
|---|---|---|---|
| 2,921,069 | 1/1960 | Ullyot | 260—268 |
| 2,928,767 | 3/1960 | Gulesich et al. | 260—268 |
| 2,931,810 | 4/1960 | Yale et al. | 260—268 |
| 2,940,969 | 6/1960 | Bonvicino et al. | 260—268 |
| 2,955,073 | 10/1960 | De Beer | 167—65 |
| 2,955,441 | 11/1960 | Van Wessem et al. | 167—65 |
| 2,985,660 | 5/1961 | Judd et al. | 260—268 |
| 3,015,660 | 1/1962 | Robinson | 260—268 |
| 3,037,024 | 5/1962 | Parcell | 260—268 |
| 3,073,847 | 6/1963 | Doebel et al. | 260—268 |
| 3,167,541 | 1/1965 | Vanderstelt | 260—268 |

FOREIGN PATENTS

| | | |
|---|---|---|
| 858,186 | 1/1961 | Great Britain. |
| 878,683 | 10/1961 | Great Britain. |
| 881,398 | 11/1961 | Great Britain. |
| 1,172,514 | 2/1959 | France. |
| 356,760 | 10/1961 | Switzerland. |

OTHER REFERENCES

Winthrop et al.: Journal Organic Chemistry, vol. 27, pp. 230–234 (January–April 1962).

NICHOLAS S. RIZZO, *Primary Examiner.*

N. H. STEPNO, JAMES W. ADAMS,
*Assistant Examiners.*